April 13, 1926.   W. MERTÉ   1,580,751
LENS SYSTEM
Filed July 19, 1924
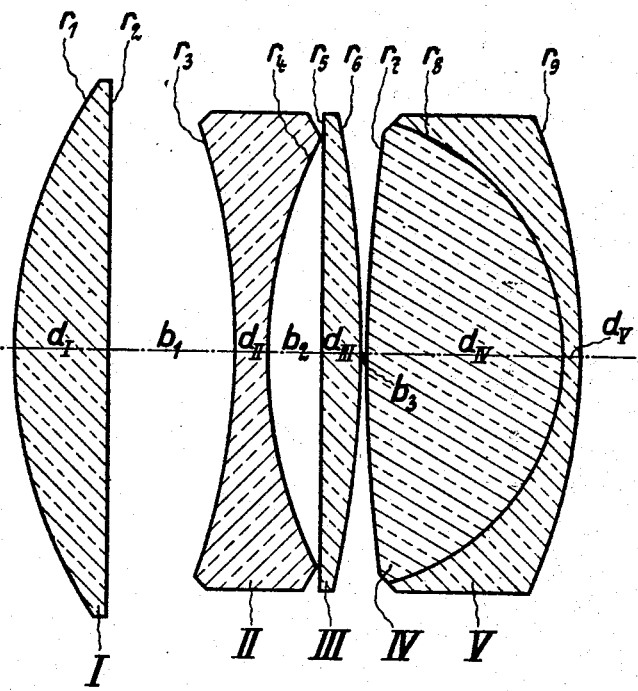
Radii:
$r_1 = +47.85$
$r_2 = \pm \infty$
$r_3 = -69.65$
$r_4 = +47.86$
$r_5 = \pm \infty$
$r_6 = -114.05$
$r_7 = +159.10$
$r_8 = -24.09$
$r_9 = -59.77$
Thicknesses and distances:
$d_I = 9.46$
$b_1 = 12.68$
$d_{II} = 3.40$
$b_2 = 5.45$
$d_{III} = 4.04$
$b_3 = 0.04$
$d_{IV} = 19.96$
$d_V = 1.82$
Kinds of glass
|  | I | II | III | IV | V |
|---|---|---|---|---|---|
| $n_D$ | 1.59015 | 1.64892 | 1.51776 | 1.62200 | 1.60820 |
| $\nu$ | 61.0 | 33.8 | 63.7 | 53.1 | 58.9 |
Focal length 100
Inventor:
Willy Merté

Patented Apr. 13, 1926.

1,580,751

UNITED STATES PATENT OFFICE.

WILLY MERTÉ, OF JENA, GERMANY, ASSIGNOR TO CARL ZEISS, OF JENA, GERMANY, A FIRM.

LENS SYSTEM.

Application filed July 19, 1924. Serial No. 727,086.

*To all whom it may concern:*

Be it known that I, WILLY MERTÉ, a citizen of Germany, and residing at Jena, Germany, have invented a new and useful Lens System (for which I have filed an application in Germany August 1, 1923), of which the following is a specification.

The present invention relates to lens systems of particularly great luminosity which, for instance, are to be used as micro-projection systems or as powerful magnifying lenses having a large field of view but in particular as photographic lenses, e. g. for kinematographic exposure and projection and which lens systems must therefore be corrected spherically, chromatically and with respect to coma. According to the present invention one attains an optical system particularly suited for the said purposes by choosing a system consisting of five members and having eight surfaces bordering on air, which system is composed of two collective single members, a biconcave single member disposed between these two collective members, and a positive cemented double member, whose partial members have opposite refractive power, whereby the dispersive partial member forms one of the outer members of the lens system and is a meniscus.

In view of the large aperture, which such a new system is to have, the same admits of attaining a very large field affording a sharp image. Thereby the new system admits of a comparatively short structure.

The annexed drawing and the subjoined tables show as an example a system according to the invention which is computed for an aperture of 1:1,9. The values given for the radii, thicknesses and distances relate to a focal length of the system of 100 units.

| Radii. | Thicknesses and distances. |
|---|---|
| $r_1 = +\ 47{,}85$ | $d_I = 9{,}46$ |
| $r_2 = \pm\ \infty$ | $b_1 = 12{,}68$ |
| $r_3 = -\ 69{,}65$ | $d_{II} = 3{,}40$ |
| $r_4 = +\ 47{,}86$ | $b_2 = 5{,}45$ |
| $r_5 = \pm\ \infty$ | $d_{III} = 4{,}04$ |
| $r_6 = -114{,}05$ | $b_3 = 0{,}04$ |
| $r_7 = +159{,}10$ | $d_{IV} = 19{,}96$ |
| $r_8 = -\ 24{,}09$ | $d_V = 1{,}82$ |
| $r_9 = -\ 59{,}77$ | |

Kinds of glass.

| | I | II | III | IV | V |
|---|---|---|---|---|---|
| $n_D$ | 1,59015 | 1,64892 | 1,51776 | 1,62200 | 1,60820 |
| $\nu$ | 61,0 | 33,8 | 63,7 | 53,1 | 58,9 |

I claim:

In a lens system corrected spherically, chromatically and with respect to coma, two collective single members, a biconcave single member disposed between these two collective members, and a positive cemented double member, whose partial members have opposite refractive power, whereby the dispersive partial member forms one of the outer members of the lens system and is a meniscus.

WILLY MERTÉ.